(12) United States Patent
Dubey et al.

(10) Patent No.: US 12,554,862 B2
(45) Date of Patent: Feb. 17, 2026

(54) INTEGRATED SECURITY ANALYSIS DATA STRUCTURE AND METHOD FOR MULTI-CONTAINER SOFTWARE PROJECTS

(71) Applicant: Schlumberger Technology Corporation, Sugar Land, TX (US)

(72) Inventors: Apoorva Dubey, Castro Valley, CA (US); Chen Lin, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/737,485

(22) Filed: Jun. 7, 2024

(65) Prior Publication Data

US 2024/0411895 A1 Dec. 12, 2024

Related U.S. Application Data

(60) Provisional application No. 63/507,157, filed on Jun. 9, 2023.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | | |
|---|---|---|---|---|
| 11,507,672 B1 * | 11/2022 | Pagnozzi | ............ | H04L 63/0263 |
| 2019/0294780 A1 * | 9/2019 | Melamed | ................ | G06F 21/53 |
| 2024/0022609 A1 * | 1/2024 | Smith | .................. | G06F 9/5088 |
| 2024/0169062 A1 * | 5/2024 | Lee | ........................ | G06F 21/554 |
| 2024/0176888 A1 * | 5/2024 | Sahar-Kaneti | ........ | G06F 21/577 |
| 2024/0289745 A1 * | 8/2024 | Larkin | .................. | G06F 21/572 |
| 2024/0330474 A1 * | 10/2024 | Plunk | .................. | H04L 63/1425 |
| 2024/0338459 A1 * | 10/2024 | Lukas | ..................... | G06F 21/57 |
| 2025/0175456 A1 * | 5/2025 | Crabtree | .................. | G06N 7/01 |

OTHER PUBLICATIONS

Anchore. Software Bill of Materials (SBOM) Management. SBOM Management Solutions. Available at: https://anchore.com/sbom/.

\* cited by examiner

*Primary Examiner* — Meng Li

(74) *Attorney, Agent, or Firm* — Jeffrey D. Frantz

(57) ABSTRACT

An integrated security analysis data structure and a method for multi-container software projects. A data repository storing containers and a software bill of materials (SBOM) is queried. The SBOM includes first data describing the containers and second data describing software images in the containers. The software images include corresponding components. The SBOM further includes metadata about the containers, the software images, and the one or more corresponding components. A dependency graph, showing dependencies among the software images, of the software images is built automatically. Usage data describing usage of the containers as deployed in an enterprise system is retrieved automatically. The SBOM, the dependency graph, and the usage data are transformed into a SBOM data structure. The SBOM data structure includes a searchable data object that is searchable by: the containers, the software images, the one or more corresponding components of the software images, the metadata, and the usage data.

20 Claims, 12 Drawing Sheets

Home / Projects / sbom-name sbom-name  7  45  32  2  1

View Details

↳Overview | ⊛Components 716 | ⇄Services 0 | ⊛Dependency Graph 0 | ⊞Audit Vulnerabilities 87 | ⚠Policy Violations 0

+Add Component | −Remove Component | ⬆Upload BOM | ⬇Download BOM ▼

Search

| Component | Version | Group | Internal | License | Risk Score | Vulnerabilities |
|---|---|---|---|---|---|---|
| ☐ abstract-logging | 2.0.1 | △ | | | 0 | 0 |
| ☐ accepts | 1.3.7 | △ | | | 0 | 0 |
| ☐ agent-base | 6.0.2 | △ | | | 0 | 0 |
| ☐ agent-base | 4.3.0 | △ | | | 0 | 0 |
| ☐ agent-base | 4.2.1 | △ | | | 0 | 0 |
| ☐ aggregate-error | 3.1.0 | △ | | | 0 | 0 |
| ☐ @ag-grid-community/angular | 23.2.1 | △ | | | 0 | 0 |
| ☐ @ag-agrid-community/core | 23.2.1 | △ | | | 0 | 0 |
| ☐ ajv | 6.12.6 | △ | | | 0 | 0 |
| ☐ ajv | 5.2.3 | △ | | | 0 | 0 |

FIG. 6C

| Component | Version | Group | Vulnerabilities | Severity | Analyzer | Attributed On | Analysis | Suppressed |
|---|---|---|---|---|---|---|---|---|
| color-string | 1.5.4 | | NVD CVE-2021-29060 | Medium | OSS Index | 11 Apr 2023 | -- | -- |
| http-cache-semantics | 4.1.0 | | NVD CVE-2022-25881 | High | OSS Index | 15 Feb 2023 | -- | -- |
| ansi-regex | 5.0.0 | | NVD CVE-2021-3807 | High | OSS Index | 15 Feb 2023 | -- | -- |
| express | 4.17.1 | | NVD CVE-2022-24999 | High | OSS Index | 15 Feb 2023 | -- | -- |
| got | 11.8.1 | | NVD CVE-2022-33987 | Medium | OSS Index | 15 Feb 2023 | -- | -- |
| jose | 2.0.3 | | NVD CVE-2021-29443 | Medium | OSS Index | 15 Feb 2023 | -- | -- |
| jose | 2.0.3 | | NVD CVE-2022-36083 | Medium | OSS Index | 15 Feb 2023 | -- | -- |
| json-schema | 0.2.3 | | NVD CVE-2021-3918 | Critical | OSS Index | 15 Feb 2023 | -- | -- |
| normalize-url | 4.5.0 | | NVD CVE-2021-33502 | High | OSS Index | 15 Feb 2023 | -- | -- |
| path-parse | 1.0.6 | | NVD CVE-2021-23343 | High | OSS Index | 15 Feb 2023 | -- | -- |

FIG. 6E

INTEGRATED SECURITY ANALYSIS DATA STRUCTURE AND METHOD FOR MULTI-CONTAINER SOFTWARE PROJECTS

RELATED APPLICATIONS

This application claims priority to U.S. Provisional Patent Application No. 63/507,157, filed 9 Jun. 2023, the entirety of which is hereby incorporated by reference.

BACKGROUND

Large software projects often involve the development of many software applications that interact with each other. One or more individual software applications in the software project may be stored in a container.

A container is a unit of software that packages the code and dependencies for a software application into a single logical package. A container may help a software application to execute quickly and reliably regardless of the underlying computing platform. Multiple containers may be designed to interact with each other in order to accomplish a larger software project.

A container, and the software applications contained therein, may include software components developed by third parties. For example, a container may include third party libraries or executable files. Third party software components may be outside of the control of the developer of the software project. Accordingly, such third-party libraries and components may be deemed untrusted, even if the libraries and components are selected for use in the software project.

In a large software project development scenario, the developer may use thousands of such untrusted software components. Thus, the software project may be subjected to many unknown security risks or unexpected changes over time.

SUMMARY

The one or more embodiments provide for an integrated security analysis data structure and a method for multi-container software projects. The method includes generating, by querying a data repository storing containers, a software bill of materials (SBOM). The SBOM includes first data describing the containers. The SBOM includes second data describing software images contained in the containers. Each of the software images includes one or more corresponding components. The SBOM further includes metadata about the containers, the software images, and the one or more corresponding components. The method also includes building, automatically, a dependency graph of the software images. The dependency graph shows dependencies among the software images. The method also includes retrieving, automatically, usage data describing usage of the containers as deployed in an enterprise system. The method also includes transforming the SBOM, the dependency graph, and the usage data into a SBOM data structure. The SBOM data structure includes a searchable data object that is searchable by: the containers, the software images, the one or more corresponding components of the software images, the metadata, and the usage data.

Other aspects of the one or more embodiments will be apparent from the following description and the appended claims.

BRIEF DESCRIPTION OF DRAWINGS

FIG. 6A, FIG. 6B, FIG. 6C, FIG. 6D, and FIG. 6E show example graphical user interfaces of a dashboard for using the SBOM data structure shown in FIG. 4, in accordance with one or more embodiments.

Like elements in the various figures are denoted by like reference numerals.

DETAILED DESCRIPTION

In general, embodiments are directed to technical security improvements in a software project that includes software containers, software applications contained therein, and various other software components. The technology includes a data structure and a method of constructing the data structure. The data structure, which may be referred to as a software bill of materials (SBOM) data structure, is a searchable data structure that permits a user or an automated process to identify software components and their interactions in order to maintain operational security of the software components.

Figure 7:
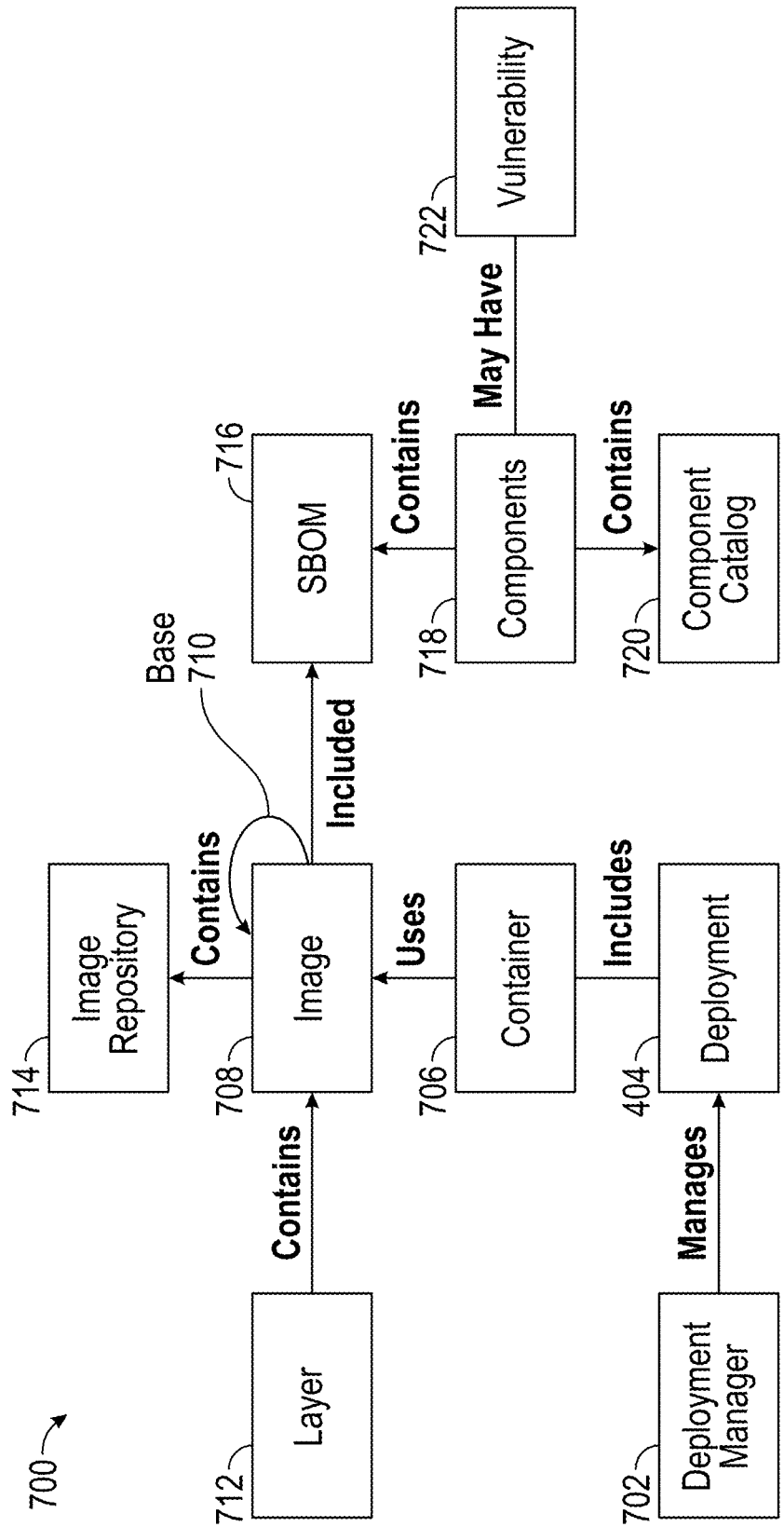
FIG. 7 shows a detailed example of a SBOM data structure, in accordance with one or more embodiments.

Describe herein are the SBOM data structure, the method of generating the SBOM data structure, and uses of the SBOM data structure. The SBOM data structure specifies the relationships among layers, software images, the SBOM information, usage information, and various software components. The SBOM data structure is stored as a searchable data structure such as, but not limited to, a dependency graph or a relational database. An example of the SBOM data structure is shown in FIG. 7.

Figure 4:
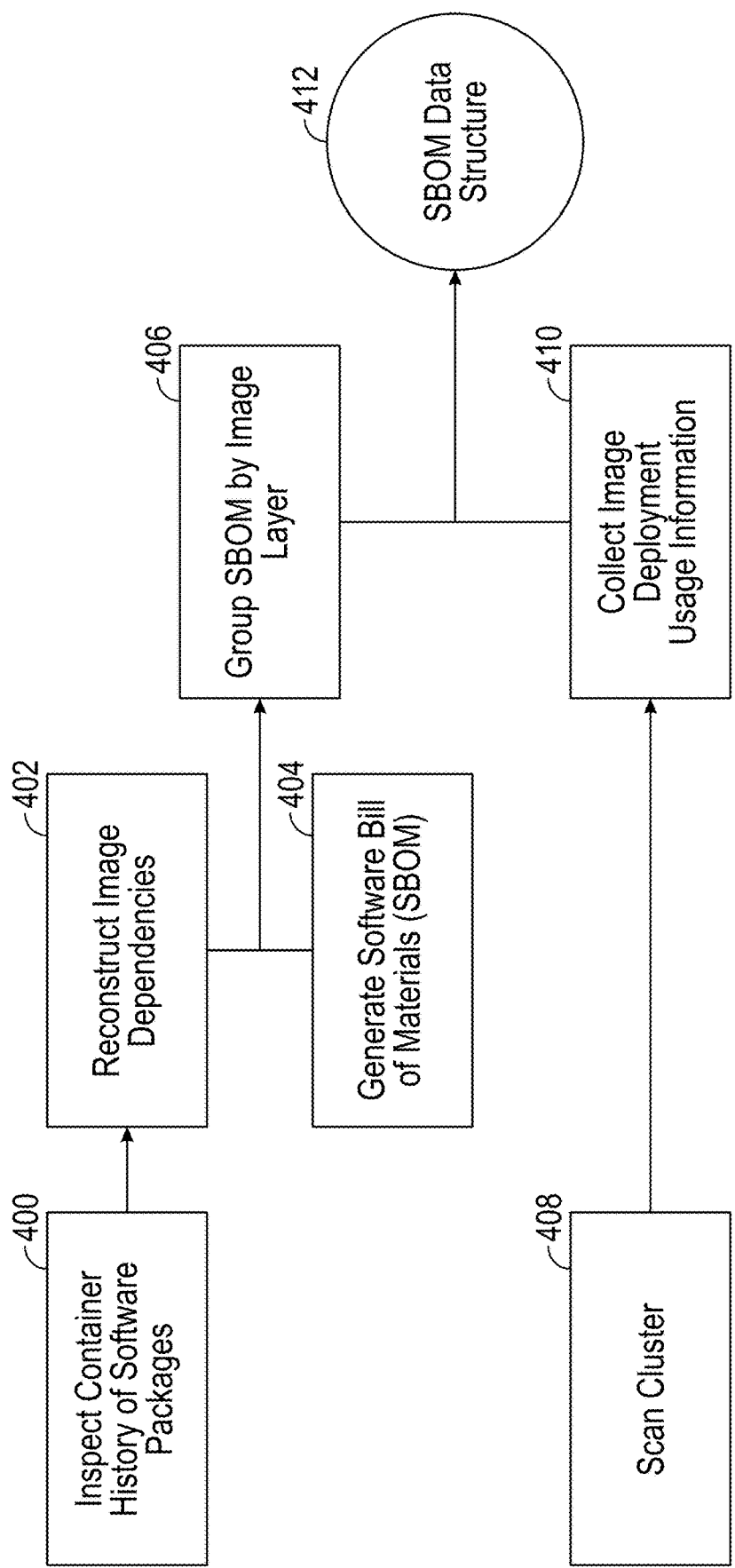
FIG. 4 is a method for generating a SBOM data structure, in accordance with one or more embodiments.

The method for building the SBOM data structure may be divided into three main parts: SBOM generation, image dependency reconstruction, image deployment collection, though the method may include other parts. The method maps component usage data, application deployment data, and vulnerability information together. Such mapping is not provided by any current solution in the public domain. An example of a method for building the SBOM data structure is shown in FIG. 4.

The one or more embodiments also provide for vulnerability tracing and remediation by querying the SBOM data structure. Thus, the one or more embodiments may provide for a holistic view of a software project, and in some cases may be used for end-to-end tracking of the software components of a software project.

Figure 1:
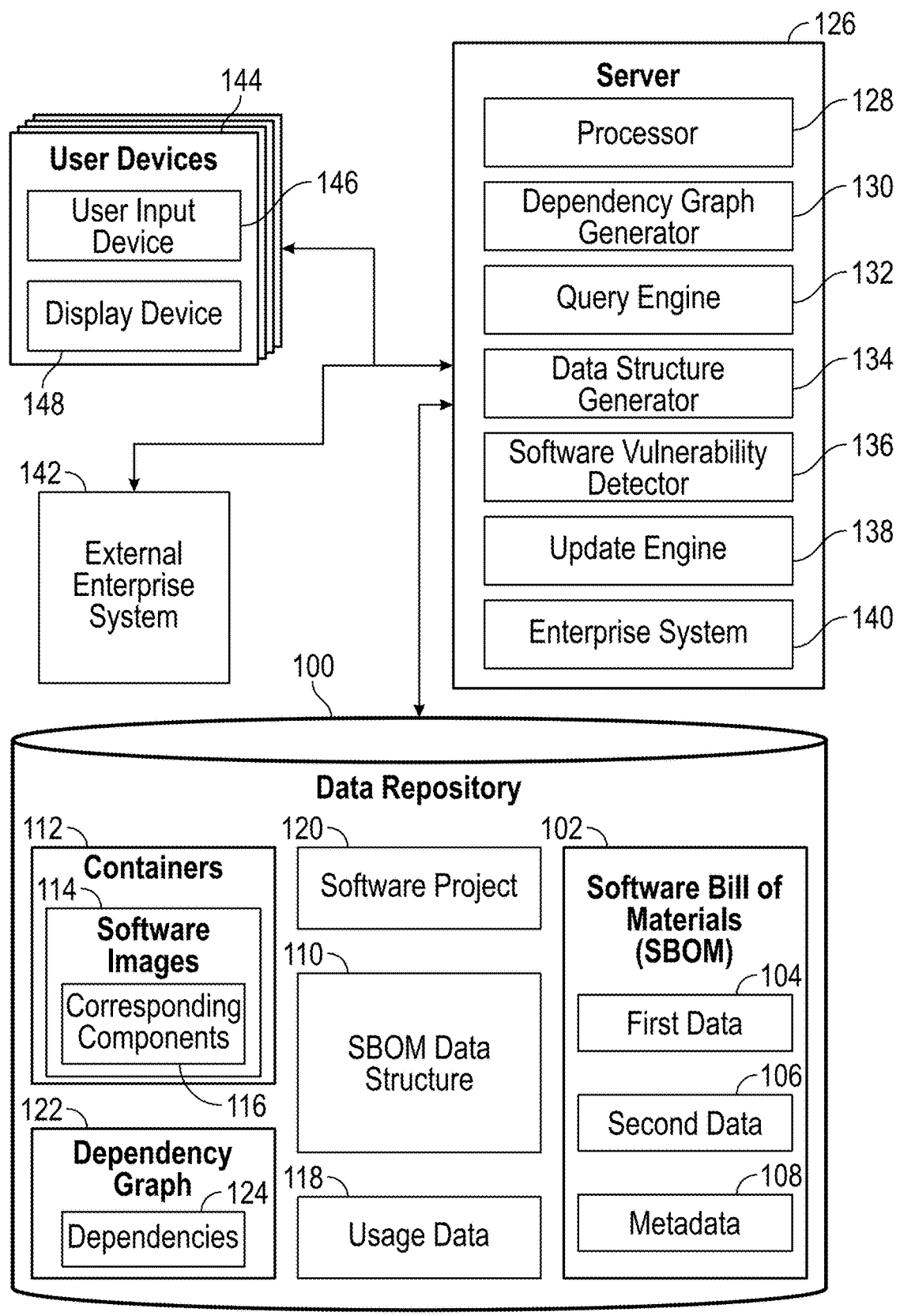
FIG. 1 shows a computing system, in accordance with one or more embodiments.

Attention is now turned to the figures, and in particular to FIG. 1. FIG. 1 shows a computing system, in accordance with one or more embodiments.

The computing system shown in FIG. 1 includes a data repository (100). The data repository (100) is a storage unit and/or device (e.g., a file system, database, data structure, or any other storage mechanism) for storing data. The data repository (100) may include multiple different, potentially heterogeneous, storage units and/or devices.

The data repository (100) stores a software bill of materials (SBOM (102)). The SBOM (102) is distinguished from the SBOM data structure (110) described below. Briefly, the SBOM (102) is a form of source data, whereas the SBOM data structure (110) is an enhanced, searchable data structure generated according to the method of FIG. 2.

The SBOM (102), as that term is used by itself (as opposed to the SBOM data structure (110)), is a software inventory of a software project (120), defined below. The SBOM (102) may list the software containers, layers of software containers, software applications, libraries, executable files, application programming interfaces (APIs), and possibly many other software components that together make up the software project (120).

The SBOM (102) may include first data (104). The first data (104) describes the containers (112), defined further below. The term "describes," with respect to the containers (112), means that the first data (104) contains information quantifying one or more facts about the containers, such as but not limited to container names, container relationships, container contents, container software components, container files, container types, etc.

The SBOM (102) also may include second data (106). The second data (106) describes one or more software images (114) contained in the containers (112). The software images (114) are defined further below. The term "describes," with respect to the software images (114), means that the second data (106) contains information quantifying one or more facts about the software images (114), such as but not limited to image layers, image types, software components, software files, etc.

The SBOM (102) also may include metadata (108). The metadata (108) describes information about the 112, the software images (114), or one or more corresponding components (116). The corresponding components (116) are defined further below, but briefly are individual files or references which form one or more of the software images (114).

In general, metadata is data about data. In the context of the one or more embodiments, the metadata (108) specifies information that may be tangential to the containers (112), the software images (114), and the corresponding components (116), or that for some reason is not pre-defined to be a part of one or more of the containers (112), the software images (114), or the corresponding components (116). The metadata (108) may include, but is not limited to, timestamps, references to source files, ownership (by a computing component or by a person or business entity), user or programmer notes such as a user identifier, enterprise relationships to another category of information in the SBOM (102) (e.g., the relationship of the corresponding components (116) to the containers (112), for example), and possibly many other types of metadata.

Thus, the SBOM (102) may be deemed part of the raw data that is used to construct the SBOM data structure (110) in some embodiments (i.e. data that has been retrieved, received, etc.). In turn, the software project (120) is a collection of at least one or more of the containers (112), the software images (114), and the corresponding components (116). However, the software project (120) may include, reference, call, or be called by other software elements outside of those in the data repository (100). Together, the software project (120), when executed by one or more processors (e.g., the processor (128), defined below), form at least some of the software that is used to either constitute some or part of an enterprise system (e.g., the enterprise system (140), defined below), or to be executed on the enterprise system (140).

The SBOM (102) may form some of the information stored in the SBOM data structure (110). In other words, other data may be included in the SBOM data structure (110) (again, defined below). For example, the SBOM data structure (110) also may include usage data (118).

The usage data (118) is information that details usage of the containers (112) as deployed in an executing enterprise system (e.g., the enterprise system (140), defined below). For example, the usage data (118) may include information such as percentage of computing resources consumed by each container, software image, or component in the containers (112); relationships of the containers (112), the software images (114), or the corresponding components (116) to other software or hardware components of the enterprise system (140); average execution times of the containers (112), the software images (114), or the corresponding components (116), etc.

Attention is now turned to the SBOM data structure (110). As mentioned above, the SBOM data structure (110) is a data structure that is constructed (e.g., using the method of FIG. 2) to organize and present the SBOM (102) and possibly other information in a form which may searched efficiently. For example, the SBOM data structure (110) may be a dependency graph (122). The dependency graph (122) is a graph data structure that describes the interrelated dependencies among the containers (112), the software images (114), the corresponding components (116) or the usage data (118).

A graph data structure includes a finite (and possibly mutable) set of nodes, together with one or more sets of unordered pairs of the nodes (in the case of an undirected graph) or one or more sets of ordered pairs of the nodes (in the case of a directed graph). The ordered pairs are known as edges (also called links or lines). The nodes may be part of the graph structure or may be external entities represented by integer indices or references defined in the nodes. A graph data structure may also associate to each edge some edge value, such as a symbolic label or a numeric attribute (cost, capacity, length, etc.) Thus, the nodes of the dependency graph (122) represent the containers (112), the software images (114), the corresponding components (116), or the usage data (118), and the metadata (108). A node in the graph data structure stores at least some of the data for an individual container, software image, component, usage data item, or metadata item.

The relationships among the containers (112), the software images (114), the corresponding components (116), and the usage data (118) are described by the edges of the graph data structure. Thus, the edges of the dependency graph (122) specify dependencies (124) among the nodes. Accordingly, the dependencies (124) are defined as the relationships among the containers (112), the software images (114), the corresponding components (116), and the usage data (118). The metadata (108) also may be associated with the nodes, the edges, or possibly may be associated with both nodes and edges.

However, the SBOM data structure (110) may also take other forms. For example, the SBOM data structure (110) may be a relational database. In this case, the SBOM (102), the usage data (118), and possibly other information may be stored in the relational database, together with additional data that describes the relationships between elements of the SBOM data structure (110).

Attention is now returned to the containers (112). A container is generally an execution environment for a software application and software library. A container virtualizes an operating system and includes the runtime, libraries, and other components that the software application uses. One or more components of software (files of various types) may be "containerized," i.e., associated into one or more containers.

Containers may be used to help software run quickly and reliably from one computing environment to another, relative to software which is not containerized. For example, containers isolate software from the environment in which the software is to be executed, thereby helping to ensure that the software executes uniformly despite differences between development and staging. In an embodiment, a container may be standalone, executable package of software that includes code, a runtime environment, system tools, system libraries and settings, etc.

Attention is now turned to the software images (114). A software image is a collection of files that make up a software package. A software image may include the executable files, libraries, and documentation useful for running the software. The files of a software image may be compressed into a single file or archive that can be downloaded and installed on a computer or other device.

The software images (114) may be layered. For example, different components of a software application may be contained in one layer, which references an inner layer that includes other software components.

The containers (112) and the software images (114) may include corresponding components (116), which also may be referred to as software components. A software component is a file, reference, or link. Files may be of many different types, such as executable files, libraries, data files, system files, application files, etc. A reference is a command to call some other software component. A link is computer code that may be used to reference some other software component. Thus, the corresponding components (116) may be files, references, or links, but also may be other kinds of software components.

As indicated above, the one or more embodiments may be used with respect to cyber security. For example, when a cyber vulnerability is detected in a vulnerable component, it may not be apparent how a vulnerable component relates to the containers (112), the software images (114), or to others of the corresponding components (116). A cyber vulnerability is some undesirable aspect of one or more of the containers (112), the software images (114), or the corresponding components (116). An example of a cyber vulnerability is a library that is out of date, or executable code which contains an error, or executable code which does not contain an error, but which may not integrate properly with some other aspect of the software project (120). The one or more embodiments may search the SBOM data structure (110) to identify the relationships of the containers (112), the software images (114), or the corresponding components (116), and act accordingly to remediate the cyber vulnerability.

The system shown in FIG. 1 may include other components. For example, the system may include a server (126). The server (126) is one or more computing systems in a possibly distributed computing environment. An example of the server (126) is the computing system and network environment shown in FIG. 8A and FIG. 8B.

The server (126) may include a processor (128). The processor (128) is one or more processors, possibly in a distributed computing environment, and may include virtual processors. The processor (128) is programmed to execute computer code which performs a computer-implemented algorithm, such as the method shown in FIG. 2.

The server (126) may include a dependency graph generator (130). The dependency graph generator (130) is software or application specific hardware that is programmed, when executed, to convert the SBOM (102), and possibly additional information such as the usage data (118), into a graph data structure that stores the raw data as nodes and edges. The dependency graph is an intermediate stage of generating the SBOM data structure (110). The process of generating the SBOM data structure (110) is described with respect to FIG. 2.

The server (126) also may include a query engine (132). The query engine (132) is software or application specific hardware that is programmed, when executed, to query the SBOM data structure (110). For example, the query engine (132) may traverse the graph data structure that constitutes the SBOM data structure (110) in order to identify the relationships among the containers (112), the software images (114), and the corresponding components (116), and various data about the same. In another example, the query engine (132) may be a structured query language that can query the SBOM data structure (110) when the SBOM data structure (110) takes the form of a relational database.

The server (126) also may include a data structure generator (134). The data structure generator (134) is software or application specific hardware that is programmed, when executed, to generate the SBOM data structure (110). In an embodiment, the SBOM data structure (110) is generated from the dependency graph. In some embodiments, the data structure generator (134) also may be the dependency graph generator (130). The process of generating the SBOM data structure (110) is described with respect to FIG. 2. An example of the output of the data structure generator (134) is shown in FIG. 7.

The server (126) also may include a software vulnerability detector (136). The software vulnerability detector (136) is software or application specific hardware that is programmed, when executed, to detect a cyber vulnerability in the containers (112), the software images (114), the corresponding components (116), or some other aspect of the enterprise system (140). The software vulnerability detector (136) may be one of several different types of dynamic application security testing (DAST) tools, such as but not limited to AKTO, APP SCANNER, DETECTIFY®, etc.

The server (126) also may include an update engine (138). The update engine (138) is software or application specific hardware that is programmed, when executed, to update one or more of the containers (112), the software images (114), or the corresponding components (116). For example, the update engine (138) may identify third party updates, time the process of updating aspects of the software project (120), etc.

The server (126) also may include an enterprise system (140). The enterprise system (140) is a collection of computer programs (such as the software project (120)) or hardware (of which the processor (128) may be a part) that, operating together, execute computer tasks that support a mission of one or more users or organizations. For example, the enterprise system (140) may control the display, manipulation, and storage of large amounts (e.g., thousands of terabytes) of complex data (e.g., data that interrelates with each other), and may also support or automate processes associated with manipulating the large amounts of complex data. In an embodiment, the software project (120) may execute on, or be a part of, the enterprise system (140).

The one or more embodiments also contemplate supporting an external enterprise system (142). The external enterprise system (142) has a similar definition to the enterprise system (140). However, the external enterprise system (142) is not under the control of the server (126), but rather is controlled by some third-party entity or system. The external enterprise system (142) may use the software project (120), and thus may desire to access the SBOM data structure (110) when executing the software project (120). In other words, it is contemplated that the one or more embodiments may be used with respect to the external enterprise system (142) or may be provided as software-as-a-service to the external enterprise system (142).

The system shown in FIG. 1 also includes one or more user devices (144). The user devices (144) are computing systems which may be in communication with the server (126). The users of the user devices (144) may use a user input device (146) and a display device (148) to interact with the server (126). The users may be data scientists which generate the SBOM data structure (110) or may be other users which access the enterprise system (140), the external enterprise system (142), or the data repository (100).

While FIG. 1 shows a configuration of components, other configurations may be used without departing from the scope of the one or more embodiments. For example, various components may be combined to create a single component. As another example, the functionality performed by a single component may be performed by two or more components.

Figure 2:
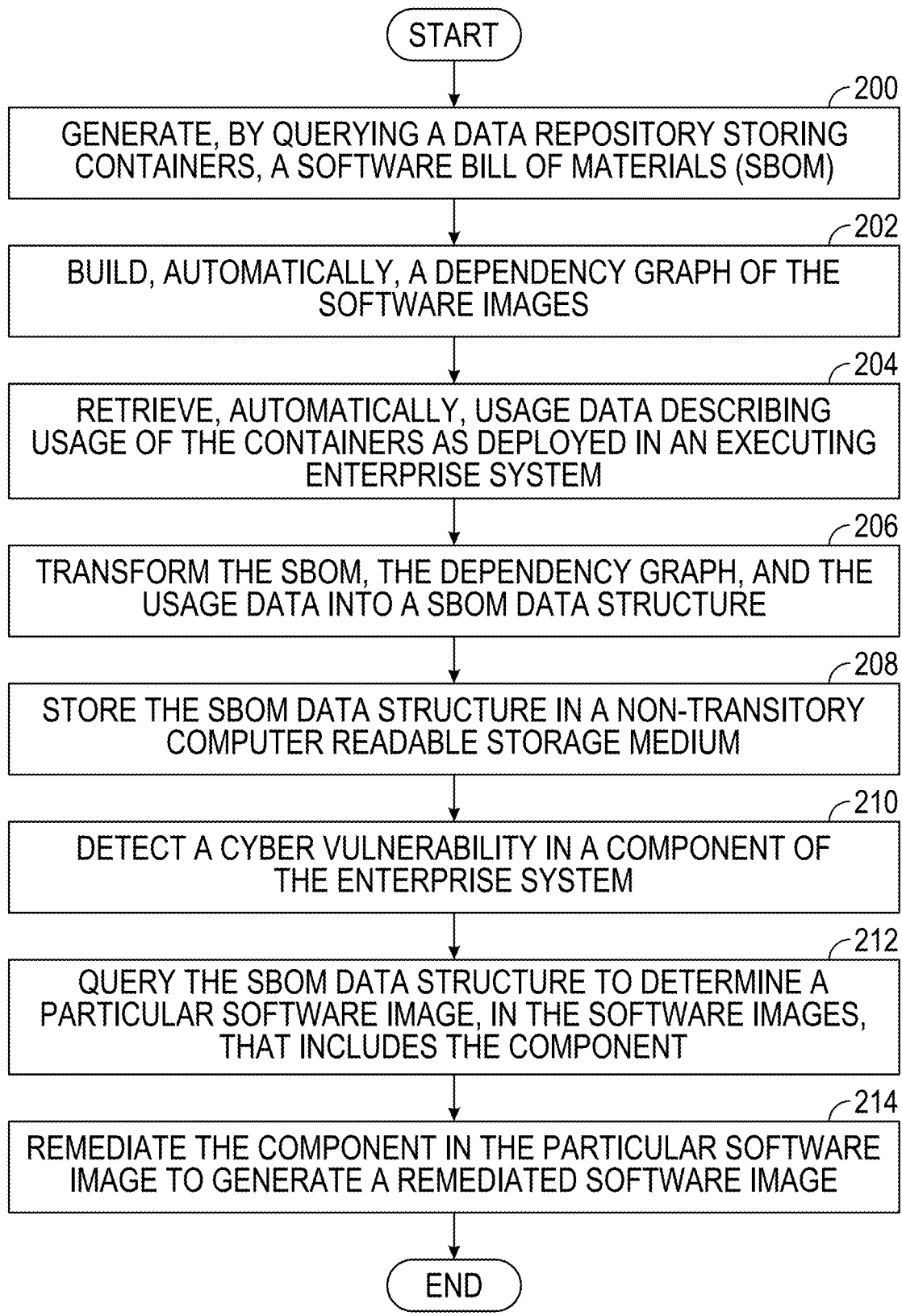
FIG. 2 shows a method for generating and using a software bill of materials (SBOM) data structure, in accordance with one or more embodiments.

FIG. 2 shows a method, in accordance with one or more embodiments. The method of FIG. 2 may be executed using the system shown in FIG. 1, possibly in conjunction with the computing system and network environment shown in FIG. 8A and FIG. 8B.

Block 200 includes generating, by querying a data repository storing containers, a software bill of materials (SBOM). The SBOM includes first data describing the containers. The SBOM includes second data describing software images contained in the containers. Each of the software images includes one or more corresponding components. The SBOM further includes metadata about the containers, the software images, and the one or more corresponding components. Thus, the SBOM is a detailed report about various containers, images, and components, including third-party and open-source components, used in the image. The report includes names, versions, license information, etc., regarding the containers, images, and components.

Generating the SBOM may be performed using one or more SBOM generation tools. SBOM generation tools include, but are not limited to, software package data exchange (SPDX), CYCLONEDX© (a copyright of the OWASP Foundation), etc.

Block 202 includes building, automatically, a dependency graph of the software images. The dependency graph shows dependencies among the software images. The dependency graph may be constructed first by retrieving and persisting container image layers information. Based on the layer information, a dependency graph is built between images. In addition, information regarding which component is introduced by which image and specific image layer is built into the dependency graph by noting the relationships among components. The dependency graph may be constructed using graph database construction software, such as but not limited to NEO4J® (a registered trademark of Neo4j, Inc) or Dependency Track (available from the OWASP foundation).

Block 204 includes retrieving, automatically, usage data describing usage of the containers as deployed in an executing enterprise system. The usage data may be collected from deployment workloads.

A variety of techniques may be used to collect the usage data. In one example, the usage data may be collected by scanning the orchestration system. In another example, the usage data may be collected by integrating an administrative webhook. In still another example, the usage data may be collected by scanning the configuration files in the code repository (e.g. by using a GitOps approach).

Collecting the usage data provides additional information which aids the construction of the SBOM data structure. For example, the usage data may indicate which image is deployed where, and by whom. Thus, it is easier to use the SBOM data structure to quickly locate containers, images, or components that may be affected by a vulnerable component.

Block 206 includes transforming the SBOM, the dependency graph, and the usage data into a SBOM data structure. The SBOM data structure includes a searchable data object that is searchable by at least one of: the containers, the software images, the one or more corresponding components of the software images, the metadata, and the usage data. By transforming, the SBOM data structure effectively maps component usage, application deployment, and vulnerability information together. Thus, the SBOM data structure represents an enhancement over the dependency graph alone.

The process of transforming may include incorporating the usage data and the SBOM into the dependency graph of the images. Thus, the process of transforming may include building a larger graph database from the dependency graph such that the SBOM and the usage data, and their interrelationships, are also interrelated with the dependency graph of the images. For example, the common attributes of the usage data and the SBOM components may be matched. Then, the SBOM, noted dependencies, and deployment layer information of the containers of the software project may be joined. The result of joining is the SBOM data structure.

In an embodiment, the method of FIG. 2 may terminate thereafter. However, the method of FIG. 2 may also proceed.

For example, block 208 may include storing the SBOM data structure in a non-transitory computer readable storage medium. The SBOM information is persisted in a database and may be updated into a common component catalog. Once stored, the SBOM data structure may be used for ongoing cyber security monitoring.

Thus, for example, block 210 may include detecting a cyber vulnerability in a component of the enterprise system. The component is among the one or more corresponding components for one or more of the software images. Detecting the cyber vulnerability may be performed using cyber security software, such as anti-viral software, update tracking software, etc.

Then, block 212 may include querying the SBOM data structure to determine a particular software image, in the software images, which includes the component. For example, a query command may be submitted to the SBOM data structure using the identified components as a basis for the search. The relationship of the identified component to other components, images, and containers may then be presented to a user, or may be submitted to an automated software process as described with respect to block 214.

Block 214 includes remediating the component in the particular software image to generate a remediated software image. The software image may be remediated by several different techniques. For example, the software image may be remediated by replacing the component within the software image, and then saving the updated software image. In another example, the component may be updated, such as by permitting the component to be updated using an external updated provided by a third-party provider. In another example, a user may adjust one or more of the containers, the software images, the identified component, or perhaps other related containers, software images, or components in the software project.

Many other examples of remediating the component exist. For example, remediating may include updating a library in the particular software image; updating an open-source executable file in the particular software image; replacing the component with a revised component; removing the component from the particular software image; and replacing the particular software image with a new software image. Still other examples are possible.

The method of FIG. 2 may be further modified. For example, the SBOM data structure may be updated. More specifically, the method also may include generating a revised SBOM data structure by repeating generating, building, retrieving, and transforming using the remediated software image. In this case, the method also may include storing the revised SBOM data structure in the non-transitory computer readable storage medium. Thus, the SBOM data structure may be updated over time in order to reflect the current state of the software project.

As indicated above, the one or more embodiments may be useful with respect to generating notifications to administrators of a software project. For example, the method of FIG. 2 also may include detecting a cyber vulnerability in a component of the enterprise system, the component being among the one or more corresponding components for one or more of the software images. Then, the method includes querying the SBOM data structure to determine a particular software image that includes the component. In this case, a notification is transmitted to a user device the particular software image contains the component.

The one or more embodiments also may be used to identify components in a software project that should be updated, starting with knowing the updated component. For example, an updated library file is received from a third-party provider, but it is not clear to which component the updated library file is to be applied, or how the updated library file may affect other components.

In this case, the method may include receiving an updated component. Then, the SBOM data structure is queried to determine a particular software image that includes an old component which corresponds to the updated component. In this case, the method also includes updating the particular software image using the updated component.

Still other variations are possible. Thus, while the various blocks in this flowchart are presented and described sequentially, at least some of the blocks may be executed in different orders, may be combined or omitted, and at least some of the blocks may be executed in parallel. Furthermore, the blocks may be performed actively or passively.

Attention is now turned to a specific set of examples shown in FIG. 3 through FIG. 7. The following examples are for explanatory purposes and not intended to limit the scope of the one or more embodiments.

Figure 3:
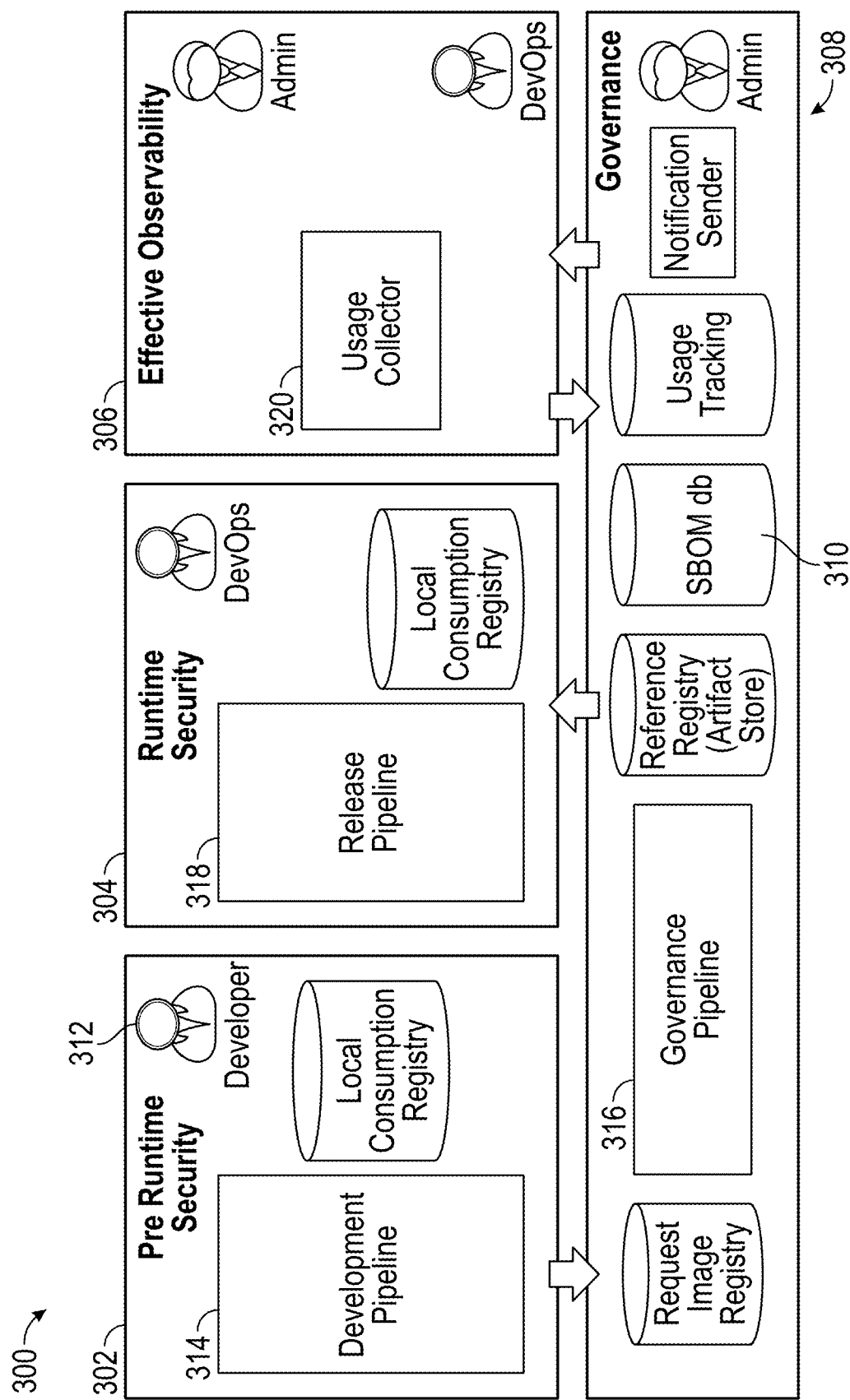
FIG. 3 shows a software project development process, in accordance with one or more embodiments.

FIG. 3 shows a software project development process (300), in accordance with one or more embodiments. The software project development process (300) includes three stages, including a pre-runtime security stage (302), a run-time security stage (304), and an effective observability stage (306). The three stages coordinate with a governance system stage (308). The governance system stage (308) is responsible for the generation and maintenance of one or more SBOM data structures stored in a SBOM database (310).

During the pre-runtime security stage (302) one or more developers (312) generate one or more software projects or aspects of the software projects in a development pipeline (314). The aspects of the software projects may include containers, images, components, or combinations thereof.

As the software aspects are finished in the development pipeline (314), the software aspects are transmitted to the governance system stage (308). The governance system stage (308) may coordinate the different aspects into a coordinated software project in a governance pipeline (316). The governance system stage (308) also may be responsible for maintaining the software project.

During the runtime security stage (304), the software project is checked for vulnerabilities and other issues prior to release of the software project via a release pipeline (318). Data scientists may use the SBOM data structures in the SBOM database (310) to check the software project for vulnerabilities, and then remediate any vulnerabilities that are found.

During the effective observability stage (306), the software project is implemented on and executed by the enterprise system. During execution, usage data regarding the software project is collected by a usage collector (320). The usage data may be used to update the SBOM data structures in the SBOM database (310). In some embodiments, the SBOM data structure may be generated after the usage collector (320) has collected the usage data. In this case, any vulnerabilities in the software project may be checked during the runtime security stage (304) either without using the SBOM data structure, or by using a preliminary SBOM data structure created without the usage data.

Attention is now turned to FIG. 4. FIG. 4 is a method for generating a SBOM data structure, in accordance with one or more embodiments. FIG. 4 may be characterized as a variation of the method shown in FIG. 2.

Block 400 includes inspecting a container history of software packages. Specifically, the history of when and how software containers were added to the software project is inspected and collected. Block 400 may be part of gathering information about the software project, blocks 402, 404, 406, 408, and 410, described below.

Block 402 includes reconstructing image dependencies for the history of software packages. In other words, the dependencies between the containers, as well as dependencies between the software images within the containers, and the relationships between the containers and the software images, are constructed at each stage during the history of the software project. The dependencies may be stored as a graph, or may be stored in a relational database, or may be stored using some other method.

Block 404 includes generating a SBOM. Generating the SBOM may be performed by receiving an original list of containers, images, and components. Alternatively, a software project may be analyzed and the names, versions, and dates of each container, image, and component may be recorded. In any case, an SBOM (not the SBOM data structure) is generated.

Block 406 includes grouping the SBOM by image layer. The information about the image dependencies (collected at block 402) and the SBOM (collected at block 404) is used to group containers, images, and components in the SBOM according to the image dependencies.

If usage information is available, then block 408 includes scanning a cluster. A cluster is a set of computing systems, possibly in a distributed computing environment. The cluster is scanned for usage information. Block 408 may be performed using a GitOps approach, or by performing some other enterprise system analysis software.

Block 410 includes collecting image deployment usage information. The image deployment usage information may include information such as which software container, image, or component is deployed on which computing system in the cluster. Vulnerabilities or anomalies on the behavior of the executing software project may also be recorded. Other usage information also may be recorded, such as frequency of execution, timestamps, user information, etc. Block 410 also may be performed using a GitOps approach, or by performing some other enterprise system analysis software.

Then, block 412 includes generating the SBOM data structure. The SBOM grouped by image layer (generated at block 406) and the deployment usage information (collected at 410) is combined into the SBOM data structure. The deployment usage information may be added, as nodes, edges, or a combination thereof to the graph data structure that specifies the SBOM grouped by image layers. The resulting SBOM data structure is a searchable data structure useful for detecting and remediating vulnerabilities, as described above with respect to FIG. 2.

Figure 5:
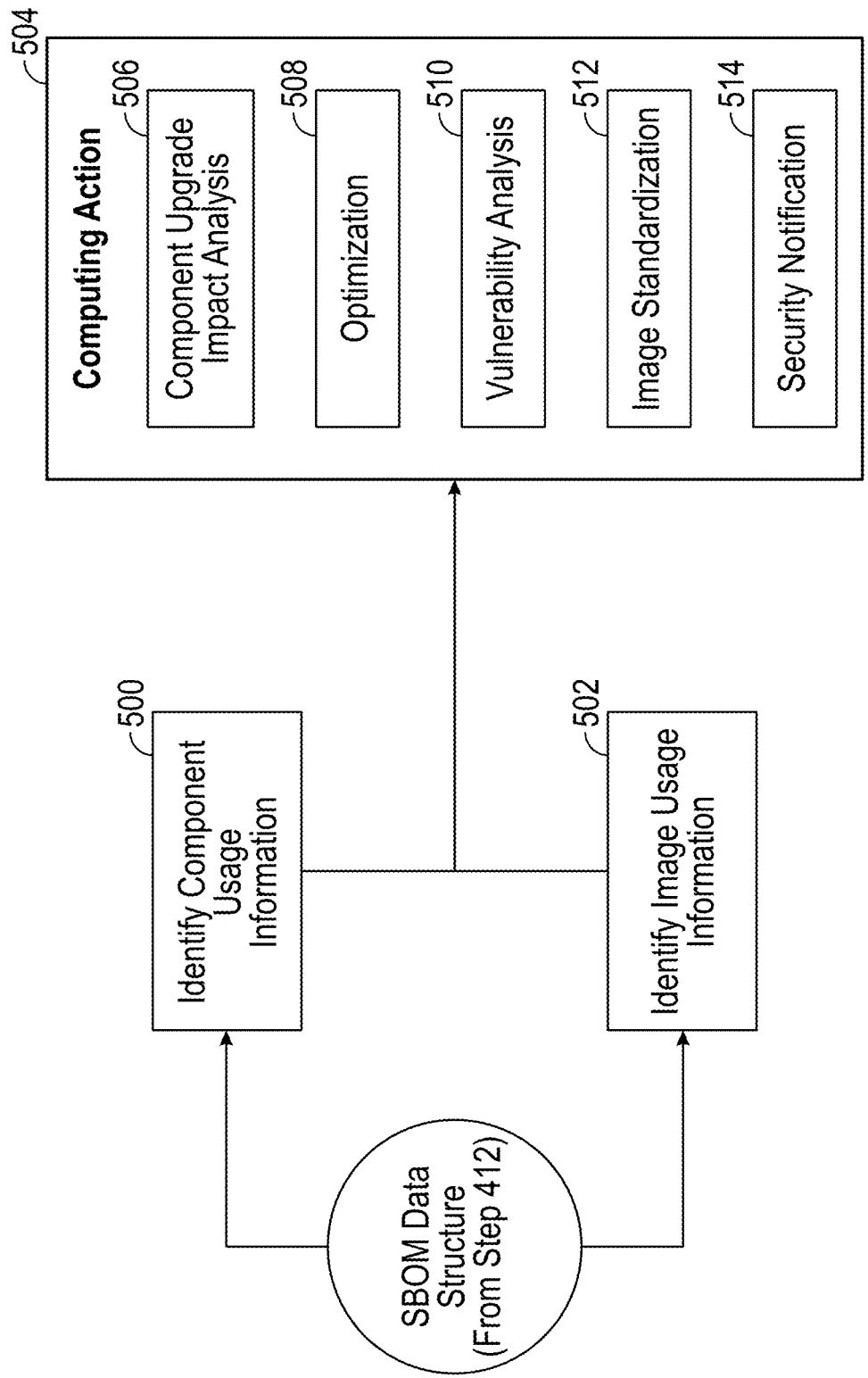
FIG. 5 is a method of using a SBOM data structure, in accordance with one or more embodiments.

FIG. 5 is a method of using a SBOM data structure. Thus, FIG. 5 shows uses for the SBOM data structure generated at block 412 of FIG. 2, in accordance with one or more embodiments.

Block 500 includes identifying component usage. Block 500 may be performed in a manner similar to that performed at block 408 and block 410 in FIG. 4.

In addition, block 502 includes identifying image usage information. Again, block 502 may be performed in a manner similar to that performed at block 408 and block 410 in FIG. 4.

Then, at block 504, a computing action is performed using the component usage information and the image usage information identified at block 500 and block 502. A computing action is the execution, by one or more processors, of software code to generate an output.

An example of the computing action is component upgrade impact analysis (block 506). In this case, the SBOM data structure is used to show which components of the software project may be impacted by an upgrade to an identified component in the software project. The SBOM data structure is queried to identify which components are related to the identified component, and an analysis can be performed regarding how an update to the identified component will affect the related components. In an embodiment in which the SBOM data structure stores the code of components, the SBOM data structure may be used as part of such an analysis, such as by querying how an update to the identified component may affect the code in the related components.

Another example of the computing action is optimization (block 508). In this case, the SBOM data structure may be queried to identify containers, images, or components that have outdated components, outdated data, or outdated code. For example, if one component is updated, then an automated process may query the SBOM data structure to determine which other affected components may be updated.

Another example of the computing action is a vulnerability analysis (block 510). The SBOM data structure may be queried to determine which components are out of date, for example, in order to identify components that are subject to security risks. In another example, if a notice is received from a third party that a commonly used component has been updated by the third party, or that the commonly used component is a vulnerable component, then the SBOM data structure may be scanned to identify where the commonly used component is located in the software project. In this manner, both the vulnerabilities in the software project and the extent of cyber threats in the software project may be identified, in response to the third party notice.

Another example of the computing action is image standardization (block 512). For example, once the image structure of the software project is known and recorded, a secure golden image of the software project may be standardized across different workloads in one or more enterprise systems. Thus, the one or more embodiments may help ensure a more consistent performance of the software project.

Another example of the computing action is security notification (514). For example, again if a third-party notification is received regarding an update to a component, the SBOM data structure may be queried to identify containers, images, and components that may be affected by the update. The affected containers, images, and components may be indirectly affected by the update to the component. In this case, a security notification regarding the affected containers, images, and components may be generated and transmitted to data scientists monitoring the software project, or possibly to external users of the software project.

Still other applications of the SBOM data structure are available. The SBOM data structure may be used obtain an image usage pattern and then generate an upgrade impact report which is useful in a zero-day vulnerability. Also, the SBOM data structure may be used for container image tracking in order to analyze usage patterns for base images. The SBOM data structure also may be used to control the usage of proprietary images in order to meter component usage and thereby charge clients of the software project according to the metered component usage.

Thus, the SBOM data structure is useful for security assessments, quality assurance, and compliance review management for software projects. Often in major business deals, a checkpoint is security and privacy concerns. The SBOM data structure may be used for customer audits and regulating compliances to provide security and privacy for the software project. Having the ability to generate SBOM data structures internally is a useful approach because, data scientists can produce multiple SBOM data structures throughout the development process in order to track component changes and search for vulnerabilities as new issues become known in older software. Thus, the SBOM data structure of the one or more embodiments may be used to identify risk exposure for a software project, reduce the development time and cost of the software project by remediating identified issues in earlier cycles, and to identify license and compliance specifications for the software project.

Attention is now turned to FIG. 6A through FIG. 6E. In particular, FIG. 6A, FIG. 6B, FIG. 6C, FIG. 6D, and FIG. 6E show example graphical user interfaces (GUIs) of a dashboard for generating and using the SBOM data structure (110) shown in FIG. 1 or the SBOM data structure of block (412) shown in FIG. 4.

Figure 6A:
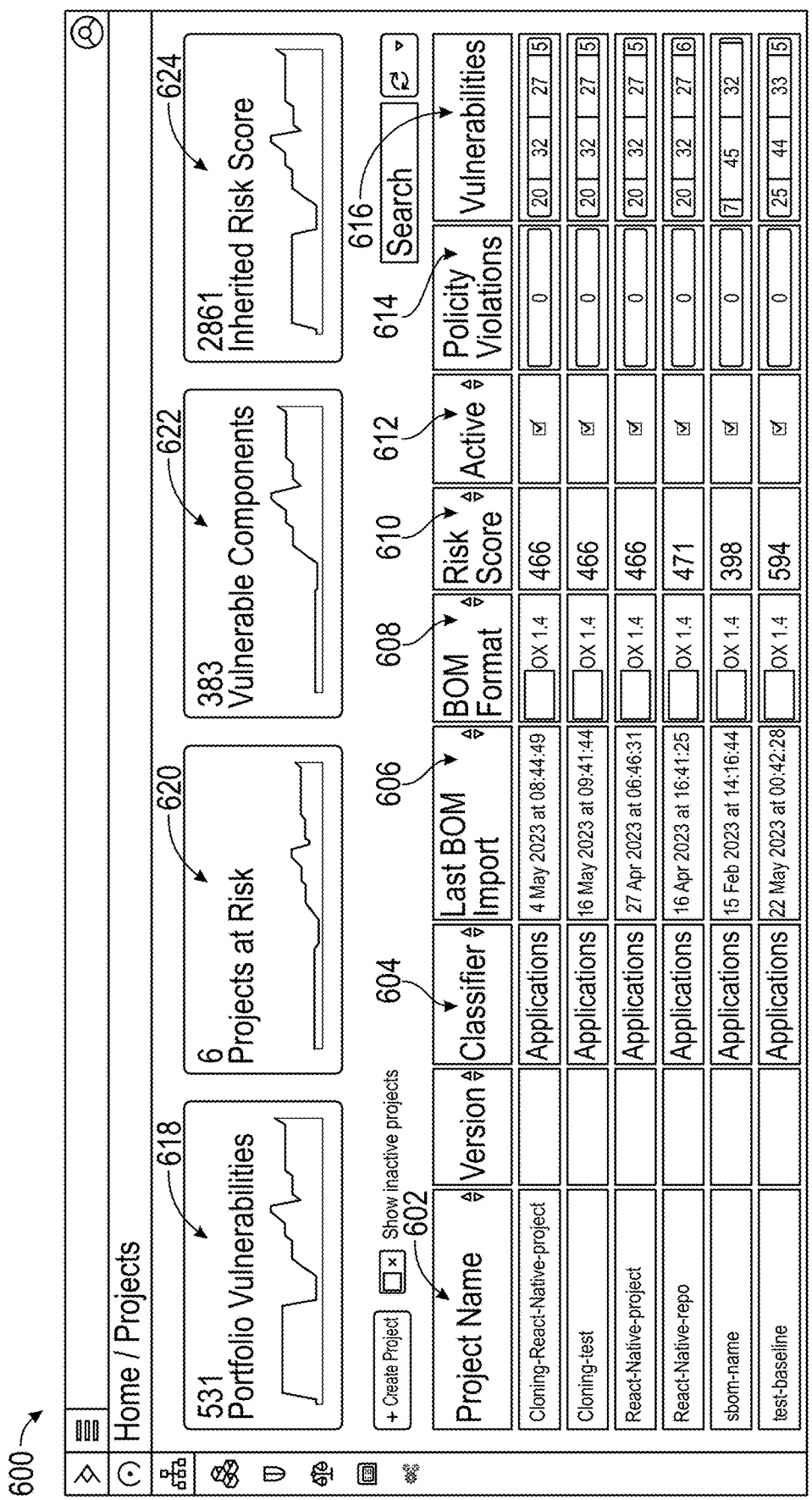

FIG. 6A shows a GUI (600) having a number of software projects (602). Various information about each of the software projects (602) may be displayed in columns, such as a classifier (604), a last change to a SBOM data structure (606), a type of format (608) of the SBOM data structure, a risk score (610), an indication (612) of whether the software project is active, a summary of policy violations (614) associated with the software project, and a summary of vulnerabilities (616) associated with the software project. Summary windows may also be shown to show the relative status of multiple software projects.

Thus, for example, summary window (618) shows portfolio vulnerabilities across the software projects. Summary window (620) shows the number of projects at risk across the software projects. Summary window (622) shows the number of vulnerable components across the software projects. Summary window (624) shows the risk scores across the software projects.

The various information shown in FIG. 6A may be generated by querying the SBOM data structure. The GUI (626) is then populated accordingly using the results returned from querying the SBOM data structure.

Figure 6B:
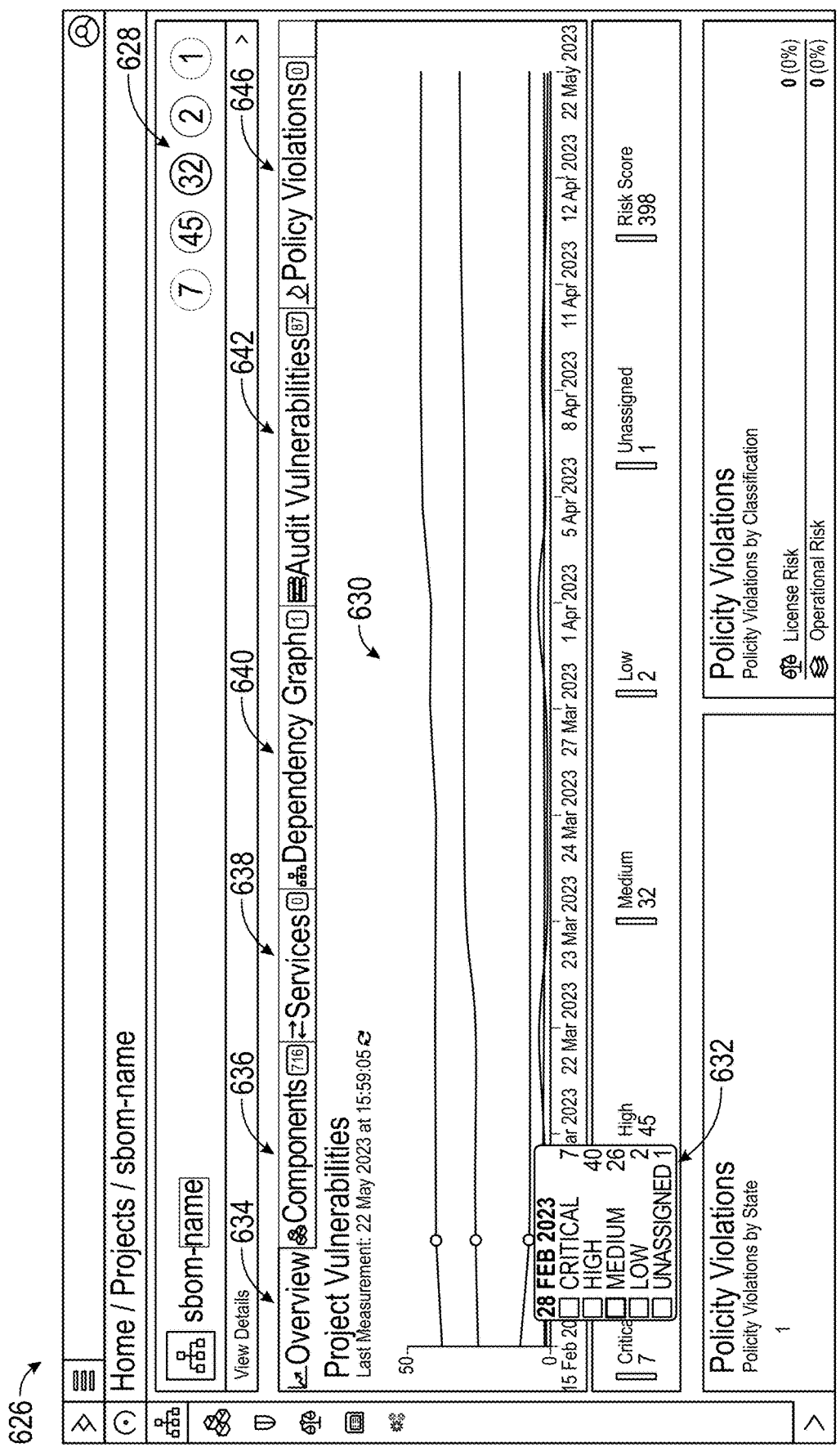

FIG. 6B shows a GUI (626) after a user has selected one of the software projects shown in the GUI (600). A summary section (628) shows a summary of the number vulnerabilities and their relative vulnerability. The vulnerabilities over time may also be displayed in a central area (630). A user may hover over one of the lines to show a pop-up window (632) having more information about the particular vulnerabilities.

The GUI (626) also shows a number of tabs. The tabs may be selected to show additional information regarding the software project. The tabs include an overview tab (634), which is shown in the central area (630) of the GUI (626). The tabs also include a components tab (636), a services tab (638), a dependency graph tab (640), an audit vulnerabilities tab (642), and a policy violations tab (644). Each tab may show a summary within the tab (e.g., the number of components that may be viewed in the components tab (646)).

The various information shown in FIG. 6B may be generated by querying the SBOM data structure. The GUI (626) is then populated accordingly using the results returned from querying the SBOM data structure.

FIG. 6C shows a GUI (648) after a user has selected the components tab (636) in FIG. 6B. A list of the components for the software project is shown in the central area (630). Various details of the components are shown, such as versions, group numbers, license information, risk core, vulnerabilities, etc. The name of each of the components shown may be a link. Selecting a name activates a hyperlink that may cause a window to open. The window may show the component itself (e.g. selecting a name of a component may expose the code or the data of the component), may show additional information about the component, or combinations thereof.

The various information shown in FIG. 6C may be generated by querying the SBOM data structure. The GUI (648) is then populated accordingly using the results returned from querying the SBOM data structure.

Figure 6D:
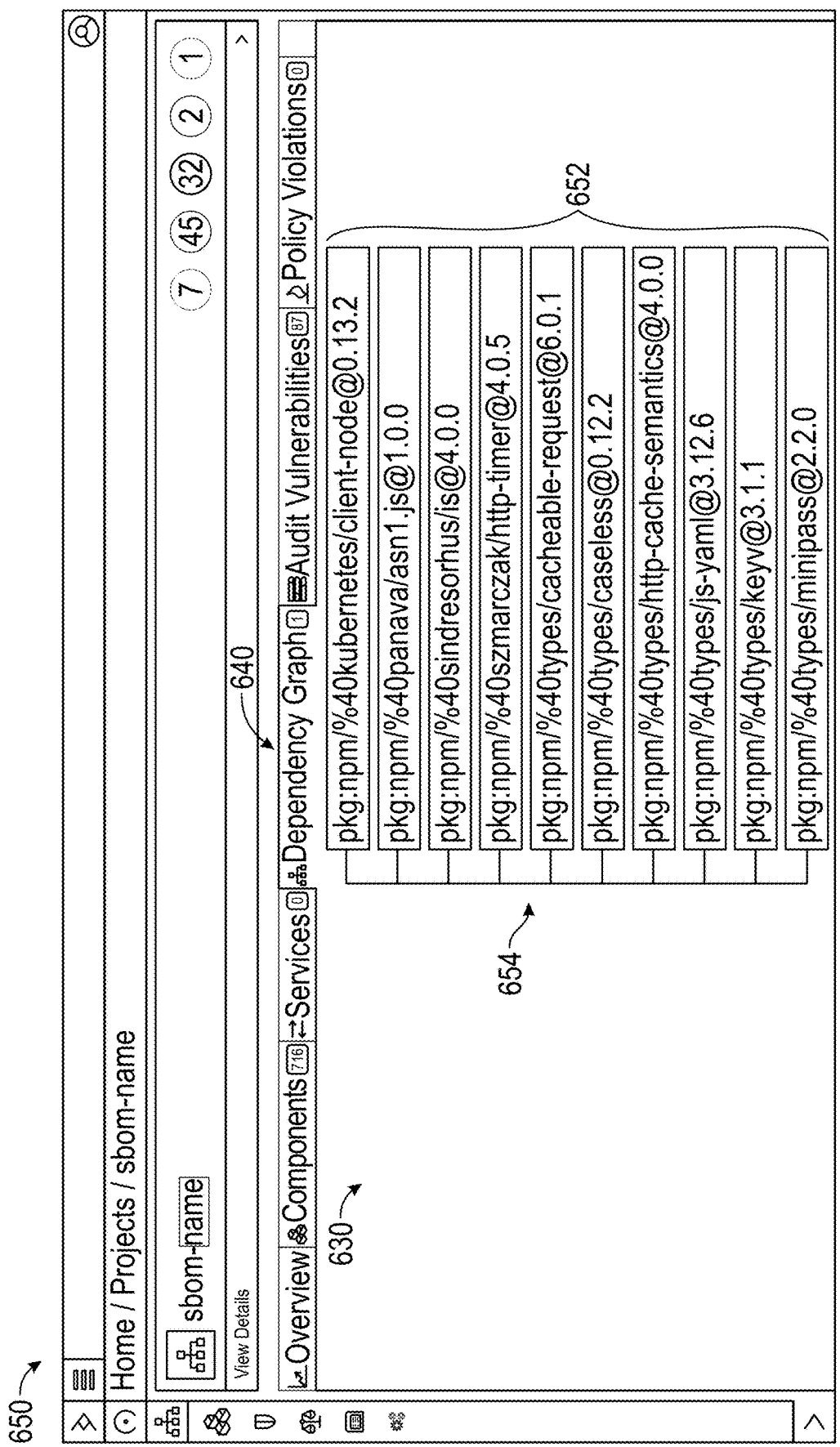

FIG. 6D shows a GUI (650) after a user has selected the dependency graph tab (640) in FIG. 6B. The dependency of each component is shown in the central area (630), relative to other components, images, and containers in the software project. While not shown in FIG. 6D, the components (652) are linked by a single line (654) which connects to another component, to an image, or to a container. Thus, the relationships of the components (652) within the software project are shown.

The various information shown in FIG. 6D may be generated by querying the SBOM data structure. The GUI (650) is then populated accordingly using the results returned from querying the SBOM data structure.

FIG. 6E shows a GUI (656) after a user has selected the audit vulnerabilities tab (642) in FIG. 6B. Each component for the selected project is shown in column (658) in the central area (630) of the GUI (656). Again, the name of each GUI may be a link which may be used to examine the details of a selected component. The version of each component is shown in column (660), along with a detected vulnerability, as shown in column (662). The severity of the vulnerability is shown in column (664), and the software tool used to detect the vulnerability is shown in column (666). The date of detection of the vulnerability is shown in column (668). Other information may also be provided, as shown.

The various information shown in FIG. 6E may be generated by querying the SBOM data structure. The GUI (656) is then populated accordingly using the results returned from querying the SBOM data structure.

FIG. 7 shows a detailed example of a SBOM data structure, in accordance with one or more embodiments. The SBOM data structure (700) may be the SBOM data structure (110) shown in FIG. 1 or may be the SBOM data structure of block (412) shown in FIG. 4. The SBOM data structure (700) may be used to generate the various GUIs shown in FIG. 6A through FIG. 6E.

The SBOM data structure (700) shown in FIG. 7 is in a software package data exchange (SPDX) format. The SBOM data structure (700) is a graph data structure. Thus, each box shows a node, and each line connecting two boxes shows an edge that defines the relationship among one or more other nodes.

Thus, for example, a deployment manager (702) manages a deployment (704). The deployment (704) includes a container (706). The container (706) uses an image (708). The base image may reference itself, as indicated by edge (710).

A layer (712) of a software container may contain the image (708). Similarly, an image repository (714) may contain the image (708).

The image (708) is included in the SBOM (716). Note that the SBOM (716) is equivalent to the SBOM (102) described with respect to FIG. 1. The SBOM data structure (110) shown in FIG. 1 is the SBOM data structure (700) shown in FIG. 7. Thus, FIG. 7 visually demonstrates major differences between a "SBOM" (as that term is used by itself) and a SBOM data structure.

The SBOM (716) contains (i.e. describes) one or more components (718) of software. A component catalog (720) may contain one or more of the components (718). In other words, the SBOM data structure (700) may include both the components (718) and the component catalog (720). Additionally, the components (718) may have one or more vulnerabilities (722) associated with one or more of the components (718). Thus, the known vulnerabilities of the components (718) may be tracked in the SBOM data structure (700).

Embodiments may be implemented on a computing system specifically designed to achieve an improved technological result. When implemented in a computing system, the features and elements of the disclosure provide a technological advancement over computing systems that do not implement the features and elements of the disclosure. Any combination of mobile, desktop, server, router, switch, embedded device, or other types of hardware may be improved by including the features and elements described in the disclosure. For example, as shown FIG. 8A, the computing system (800) may include one or more computer processor(s) (802), non-persistent storage device(s) (804), persistent storage device(s) (806), a communication interface (808) (e.g., Bluetooth interface, infrared interface, network interface, optical interface, etc.), and numerous other elements and functionalities that implement the features and elements of the disclosure. The persistent storage device(s) (806) may be characterized as a non-transitory computer readable storage medium storing program code, which when executed by a processor, performs a computer-implemented algorithm, such as the methods shown in FIG. 2 and FIG. 4. The computer processor(s) (802) may be an integrated circuit for processing instructions. The computer processor(s) may be one or more cores or micro-cores of a processor. The computer processor(s) (802) includes one or more processors. The one or more processors may include a central processing unit (CPU), a graphics processing unit (GPU), a tensor processing units (TPU), combinations thereof, etc.

The input devices (810) may include a touchscreen, keyboard, mouse, microphone, touchpad, electronic pen, or any other type of input device. The input devices (810) may receive inputs from a user that are responsive to data and messages presented by the output devices (812). The inputs may include text input, audio input, video input, etc., which may be processed and transmitted by the computing system (800) in accordance with the disclosure. The communication interface (808) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the output devices (812) may include a display device, a printer, external storage, or any other output device. One or more of the output devices may be the same or different from the input device(s). The input and output device(s) may be locally or remotely connected to the computer processor(s) (802). Many different types of computing systems exist, and the aforementioned input and output device(s) may take other forms. The output devices (812) may display data and messages that are transmitted and received by the computing system (800). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 8A:
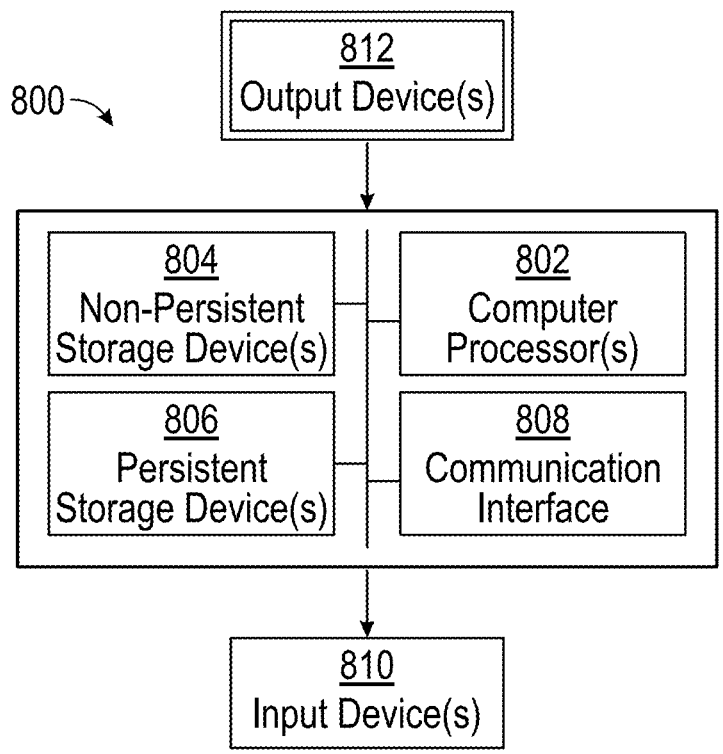
FIG. 8A and FIG. 8B show a computing system and network environment, in accordance with one or more embodiments.
Figure 8B:
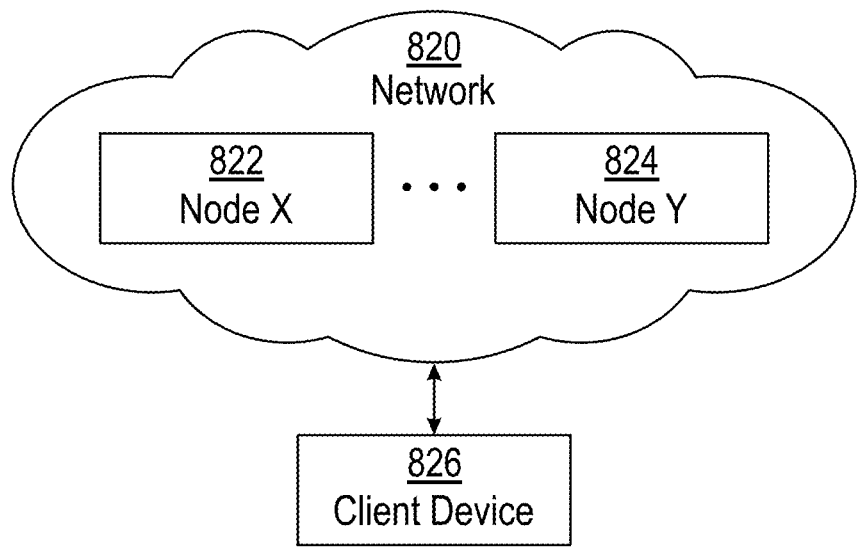

The computing system (800) FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (800) may be located at a remote location and connected to the other elements over a network.

The nodes (e.g., node X (822), node Y (824)) in the network (820) may be configured to provide services for a client device (826), including receiving requests and transmitting responses to the client device (826). For example, the nodes may be part of a cloud computing system. The client device (826) may be a computing system, such as the computing system shown in FIG. 8A. Further, the client device (826) may include and/or perform at least some of the one or more embodiments.

The computing system of FIG. 8A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and blocks shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodi-

What is claimed is:

1. A method comprising:
generating, by querying a data repository storing a plurality of containers, a software bill of materials (SBOM), wherein:
the SBOM comprises first data describing the plurality of containers,
the SBOM comprises second data describing a plurality of software images contained in the plurality of containers, each of the plurality of software images comprising one or more corresponding components, and
the SBOM further comprises metadata about the plurality of containers, the plurality of software images, and the one or more corresponding components;
building, automatically, a dependency graph of the plurality of software images, wherein the dependency graph shows dependencies among the plurality of software images;
retrieving, automatically, usage data describing usage of the plurality of containers as deployed in an enterprise system; and
transforming the SBOM, the dependency graph, and the usage data into a SBOM data structure, wherein the SBOM data structure comprises a searchable data object that is searchable by: the plurality of containers, the plurality of software images, the one or more corresponding components of the plurality of software images, the metadata, and the usage data.

2. The method of claim 1, further comprising:
storing the SBOM data structure in a non-transitory computer readable storage medium.

3. The method of claim 1, wherein the SBOM data structure maps component usage, application deployment, and vulnerability information together.

4. The method of claim 1, further comprising:
detecting a cyber vulnerability in a component of the enterprise system, the component being among the one or more corresponding components for one or more of the plurality of software images;
querying the SBOM data structure to determine a particular software image, in the plurality of software images, that includes the component; and
remediating the component in the particular software image to generate a remediated software image.

5. The method of claim 4, further comprising:
generating a revised SBOM data structure by repeating generating, building, retrieving, and transforming using the remediated software image; and
storing the revised SBOM data structure in a non-transitory computer readable storage medium.

6. The method of claim 4, wherein remediating comprises at least one of:
updating a library in the particular software image;
updating an open-source executable file in the particular software image;
replacing the component with a revised component;
removing the component from the particular software image; and
replacing the particular software image with a new software image.

7. The method of claim 1, further comprising:
detecting a cyber vulnerability in a component of the enterprise system, the component being among the one or more corresponding components for one or more of the plurality of software images;
querying the SBOM data structure to determine a particular software image, in the plurality of software images, that includes the component; and
transmitting a notification to a user device the particular software image contains the component.

8. The method of claim 1, further comprising:
receiving an updated component;
querying the SBOM data structure to determine a particular software image, in the plurality of software images, that includes an old component, that is older than the updated component, which corresponds to the updated component; and
updating the particular software image using the updated component.

9. A non-transitory computer readable storage medium storing program code, which when executed by a processor, performs a computer-implemented algorithm comprising:
generating, by querying a data repository storing a plurality of containers, a software bill of materials (SBOM), wherein:
the SBOM comprises first data describing the plurality of containers,
the SBOM comprises second data describing a plurality of software images contained in the plurality of containers, each of the plurality of software images comprising one or more corresponding components, and
the SBOM further comprises metadata regarding the plurality of containers, the plurality of software images, and the one or more corresponding components;
building, automatically, a dependency graph of the plurality of software images, wherein the dependency graph shows dependencies among the plurality of software images;
retrieving, automatically, usage data describing usage of the plurality of containers as deployed in an enterprise system;
transforming the SBOM, the dependency graph, and the usage data into a SBOM data structure, wherein the SBOM data structure comprises a searchable data object that is searchable by: the plurality of containers, the plurality of software images, the one or more corresponding components of the plurality of software images, the metadata, and the usage data; and
storing the SBOM data structure in the non-transitory computer readable storage medium.

10. The non-transitory computer readable storage medium of claim 9, wherein the computer-implemented algorithm further comprises:
detecting a cyber vulnerability in a component of the enterprise system, the component being among the one or more corresponding components for one or more of the plurality of software images;
querying the SBOM data structure to determine a particular software image, in the plurality of software images, that includes the component; and
remediating the component in the particular software image to generate a remediated software image.

11. The non-transitory computer readable storage medium of claim 10, wherein the computer-implemented algorithm further comprises:
generating a revised SBOM data structure by repeating generating, building, retrieving, and transforming using the remediated software image; and
storing the revised SBOM data structure in the non-transitory computer readable storage medium.

12. The non-transitory computer readable storage medium of claim 10, wherein, in the computer-implemented algorithm, remediating comprises at least one of:
- updating a library in the particular software image;
- updating an open-source executable file in the particular software image;
- replacing the component with a revised component;
- removing the component from the particular software image; and
- replacing the particular software image with a new software image.

13. The non-transitory computer readable storage medium of claim 9, wherein the computer-implemented algorithm further comprises:
- detecting a cyber vulnerability in a component of the enterprise system, the component being among the one or more corresponding components for one or more of the plurality of software images;
- querying the SBOM data structure to determine a particular software image, in the plurality of software images, that includes the component; and
- transmitting a notification to a user device the particular software image contains the component.

14. The non-transitory computer readable storage medium of claim 9, wherein the computer-implemented algorithm further comprises:
- receiving an updated component;
- querying the SBOM data structure to determine a particular software image, in the plurality of software images, that includes an old component, that is older than the updated component, which corresponds to the updated component; and
- updating the particular software image using the updated component.

15. A system comprising:
- a processor;
- a data repository in communication with the processor and storing:
- a plurality of containers containing a plurality of software images, wherein each of the plurality of software images comprises one or more corresponding components,
- a software bill of materials (SBOM) comprising:
- first data describing the plurality of containers,
- second data describing the plurality of software images contained in the plurality of containers, and
- metadata regarding the plurality of containers, the plurality of software images, and the one or more corresponding components,
- a dependency graph of the plurality of software images, wherein the dependency graph shows dependencies among the plurality of software images,
- usage data describing usage of the plurality of containers as deployed in an enterprise system, and
- a SBOM data structure comprising a searchable data object that is searchable by: the plurality of containers, the plurality of software images, the one or more corresponding components of the plurality of software images, the metadata, and the usage data;
- a dependency graph generator programmed, when executed by the processor, to build the dependency graph;
- a query engine programmed, when executed by the processor, to retrieve the usage data; and
- a data structure generator programmed, when executed by the processor, to transform the SBOM, the dependency graph, and the usage data into the SBOM data structure.

16. The system of claim 15, further comprising:
- a software vulnerability detector programmed, when executed by the processor, to:
- detect a cyber vulnerability in a component of the one or more corresponding components;
- query the SBOM data structure to determine a particular software image, in the plurality of software images, that includes the component; and
- remediate the component in the particular software image to generate a remediated software image.

17. The system of claim 16, wherein the data structure generator is further programmed, when executed by the processor, to:
- generate a revised SBOM data structure by repeating generating, building, retrieving, and transforming using the remediated software image; and
- store the revised SBOM data structure in the data repository.

18. The system of claim 15, further comprising:
- a software vulnerability detector programmed, when executed by the processor, to:
- detect a cyber vulnerability in a component of the one or more corresponding components;
- query the SBOM data structure to determine a particular software image, in the plurality of software images, that includes the component; and
- transmit a notification to a user device the particular software image contains the component.

19. The system of claim 15, further comprising:
- an update engine programmed, when executed by the processor, to:
- receive an updated component;
- query the SBOM data structure to determine a particular software image, in the plurality of software images, that includes an old component, that is older than the updated component, which corresponds to the updated component; and
- update the particular software image using the updated component.

20. The system of claim 15, wherein the SBOM data structure maps component usage, application deployment, and vulnerability information together.

* * * * *